US005100212A

United States Patent [19]

Schwappach

[11] Patent Number: 5,100,212

[45] Date of Patent: Mar. 31, 1992

[54] ARRANGEMENT OF A TENSIONING WHEEL OF MULTI-PART CONSTRUCTION FOR A TRACKED VEHICLE

[75] Inventor: Dieter Schwappach, Dortmund, Fed. Rep. of Germany

[73] Assignee: O&K Orenstein & Koppel Aktiengesellschaft, Dortmund, Fed. Rep. of Germany

[21] Appl. No.: 541,703

[22] Filed: Jun. 21, 1990

[30] Foreign Application Priority Data

Jul. 3, 1989 [DE] Fed. Rep. of Germany ....... 3921789

[51] Int. Cl.[5] ........................ B62D 55/30

[52] U.S. Cl. ........................ 305/31; 305/29

[58] Field of Search ........................ 305/10, 21, 22, 29, 305/31, 32

[56] References Cited

U.S. PATENT DOCUMENTS 1,392,417 10/1921 Hicks .................................... 305/22

1,926,244 9/1933 Sargent .................................... 305/32

3,329,227 7/1967 Nodwell et al. .................. 305/10 X

FOREIGN PATENT DOCUMENTS 9011884 11/1990 Fed. Rep. of Germany .

*Primary Examiner*—Russell D. Stormer

*Attorney, Agent, or Firm*—Martin A. Farber

[57] ABSTRACT

A system of a tensioning wheel of multi-part construction for a tracked vehicle and a mounting for the wheel includes (a) a support body on the lateral vehicle superstructure, (b) an idler-wheel carrier which partially surrounds the support body and is displaceable in the longitudinal direction of the vehicle, and (c) an idler wheel which is rotatable around the idler-wheel carrier. Furthermore, a connecting member is guided from the idler-wheel carrier through the wall of the support body, which is made partially hollow as a cavity in the transverse direction of the vehicle, to an adjusting element disposed in the cavity.

19 Claims, 3 Drawing Sheets

1
2
3
4
5
6
7
8
9
B
B'

ARRANGEMENT OF A TENSIONING WHEEL OF MULTI-PART CONSTRUCTION FOR A TRACKED VEHICLE

FIELD AND BACKGROUND OF THE INVENTION

The present invention relates to tensioning wheel of multipartite construction for a tracked vehicle.

The traction system for tracked vehicles has, as a rule, among other things, within the loop of the track, at its one point of reversal the track drive wheel and at its other point of reversal the track tensioning wheel. Such tensioning wheels serve to maintain the track under a pre-selectable tension despite any lengthening which occurs during operation as a result of wear and upon any shortening due to bending out of track links when traveling over uneven spots in the ground.

The track tensioning wheels are therefore arranged for movement under spring action and in two sections, i.e. supported in two bearings. The spring elements are attached to the central axle on both sides of the tensioning wheel and extend in space within the loop of the track in the longitudinal direction of the vehicle.

Such a manner of construction limits the adjacent track rollers both in their size and with respect to the total number of them required. The spring elements can only be installed, and then removed in case of damage together with the track. They are only inadequately or in part not at all, accessible for maintenance. Thus, these elements result in a limited operating life which goes hand in hand with limited economic efficiency.

SUMMARY OF THE INVENTION

It is the object of the invention to create a spring-action tensioning wheel of space-saving construction which avoids interference with a dimensioning of the track rollers. It is to be not only accessible for maintenance but is to make the maintenance of many parts possible for the first time. The spring elements are to be capable of replacement, if required, without disassembly of the track. In particular, higher economic efficiency of the traction system for track-laying or caterpillar-type vehicles is to be obtained.

The object of the invention is accomplished by a tensioning wheel of multi-part construction for a tracked vehicle, characterized by mountings in the manner that there are provided a) a support body (7) on the lateral vehicle superstructure, and b) an idler-wheel carrier (6) which partially surrounds the support body (7) and is displaceable in the longitudinal direction of the vehicle, and c) an idler wheel (5) which is rotatable around the idler-wheel carrier (6), a connecting member being conducted from the idler-wheel carrier through the wall of the support body (7), which is made partially hollow in transverse direction of the vehicle, to an adjusting element (8) arranged in the cavity.

The advantage of the invention does not reside only in the elimination of the above-described disadvantages of the known construction but it is, in particular, possible for the first time, in accordance with the invention and at little expense, to mount also the tensioning wheel of a tracked vehicle in a single section, i.e. cantilevered with only one mounting support point. Furthermore, the tensioning wheel and its mount remain free of moments since the spring force and the idler-wheel carrier are arranged in the transverse central plane of the idler.

In a further development of the invention, an adjusting device by means of which any lengthening of the track which occurs during operation as a result of wear can be compensated for in the lateral vehicle superstructure at little expense.

BRIEF DESCRIPTION OF THE DRAWINGS

With the above and other objects and advantages in view, the present invention will become more clearly understood in connection with the detailed description of a preferred embodiment, when considered with the accompanying drawings, of which.

DETAILED DESCRIPTION OF THE PREFERRED EMBODIMENT

Figure 1:
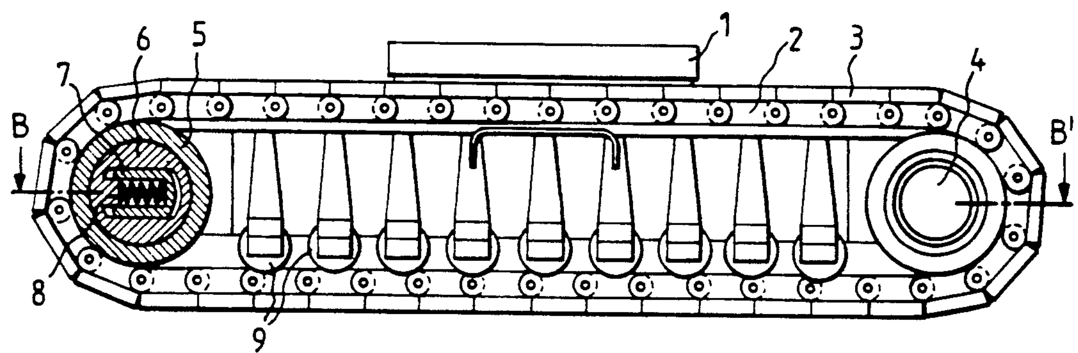
FIG. 1 shows in elevation, partially in section, a side view of the traction system of a tracked vehicle, for instance an excavator or bulldozer.

The showing of the traction system for a mobile vehicle chassis (1) according to FIG. 1 shows, within the loop of the track (2) having the track shoes (3), the drive wheel (4) in one end region, and the multi-part tensioning wheel in the other reversal region of the track (2). The latter consists in detail of the idler wheel (5), an idler-wheel carrier (6), the support body (7) and the adjusting element (8). FIG. 1 furthermore shows the spatial arrangement of track rollers (9) with respect, in particular, to the tensioning wheel.

Figure 2:
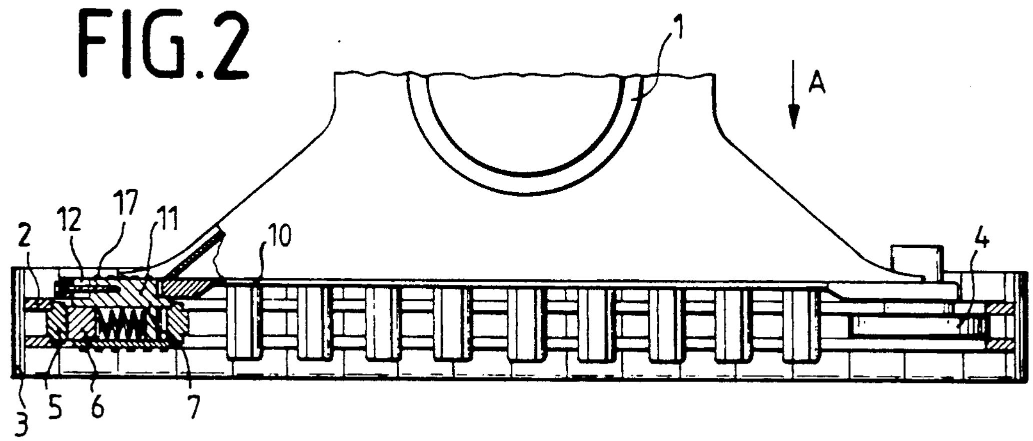
FIG. 2 shows a top view of the arrangement of FIG. 1.

FIG. 2, as top view of parts of FIG. 1 and as sectional view along the plane B—B' clearly illustrates the space-saving construction of the tensioning wheel, including the required adjusting elements. In this connection there is taken as basis for the vehicle superstructure a beam support (10) of solid material provided in the longitudinal direction of the vehicle. In order to receive the mount for the support body (7), it is reinforced in the tread-reversal area, as shown in the sectional view.

Figure 3:
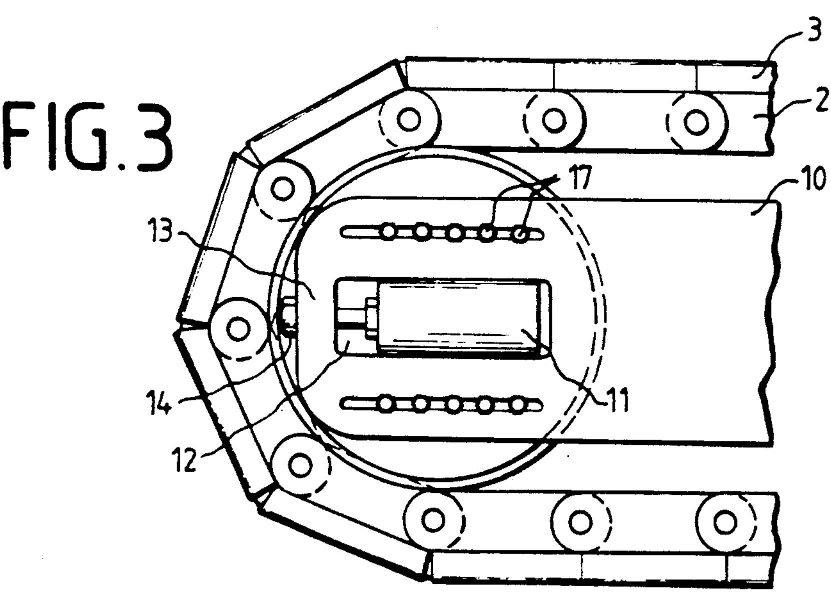
FIG. 3 is a view in the direction of the arrow A of FIG. 2.

Going beyond the basic concept of the invention, in accordance with which the support body is mounted fixed in position merely on the side of the vehicle superstructure or within it, FIG. 3 shows an embodiment for an adjusting device of the support body (7) by means of which, in particular, track lengthenings due to the occurrence of wear within the track can be compensated for in adjustable manner. From the embodiment shown there can be noted a crossbar-like development (11) in the longitudinal direction of the vehicle on the support body (7). It engages into a slot-like mounting opening (12) in the end region of the lateral vehicle superstructure. The adjusting of the support body (7) by its crossbar-like development (11) is effected by an adjustable screw (14) engaging through the edge (13) of the end region of the vehicle superstructure. An adjusted position can be brought about by screws (17) by means of frictional lock between the plate surface (15) of the support body (7) and the lateral vehicle superstructure, the beam (10).

The embodiment of FIG. 2 shows a cantilevered mounting of the support body (7) in the lateral vehicle superstructure.

It can be noted already from the sectional view of FIG. 2 that an adjusting element (8) is arranged within the support body (7) which is developed partially hollow in transverse direction of the vehicle. The adjusting element (8) has preferably a spring characteristic which is indicated by the symbolic showing of a coil spring. The spring force can in this connection be represented by a substance with spring properties which fills the cavity (20) of the hollow body of the support body (7), or else discrete components such as an encapsulated spring, or also a hydraulic cylinder having spring characteristics can be used. In the last-mentioned case, the cylinder spaces of the hydraulic cylinder will be hydraulically connected to an accumulator with spring characteristics. However, direct adjusting commands produced by means of a computer can also be given the hydraulic cylinder in simulation of a spring characteristic.

FIG. 3 is a view in the direction of the arrow A of FIG. 2. There can clearly be noted the inward-directed crossbar-like development (11) of the support body (7) in the slot-like bearing opening (12) in the end region of the lateral vehicle superstructure, the lockable adjusting screw (14) which is conducted through the edge (13) of the end of the region of the vehicle superstructure and the screws (17) which produce the frictional lock between the plate surface (15) of the support body (7) and lateral vehicle superstructure, the beam (10).

Figure 4:
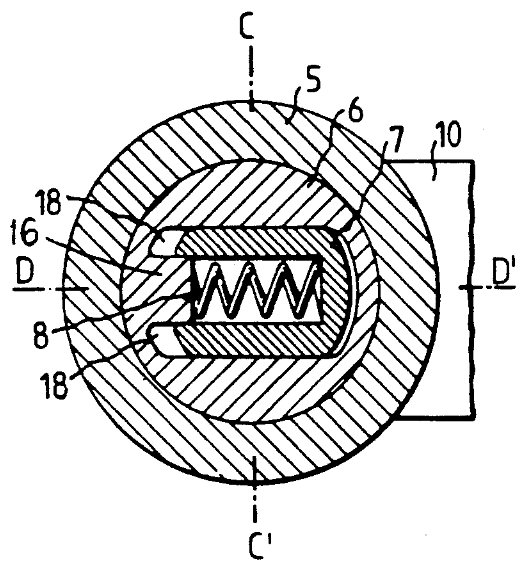
FIGS. 4 to 10 illustrate the mountings and different positions of the tensioning wheel under different operating conditions.

FIG. 4 shows the position of the tensioning wheel without load. It can be noted that the idler-wheel carrier, which is arranged displaceable on the support body (7), has pushed the tensioning wheel far out towards the left under the action of the adjusting element (8). The transmitting of the force of the adjusting element (8) to the idler-wheel carrier (6) can be effected by a separate mechanical connecting member, for instance a bolt. The example shown indicates an embodiment in which a pin (16) is developed on the inner wall of the idler-wheel carrier (6), the pin being conducted directly to the adjusting element (8).

Figure 5:
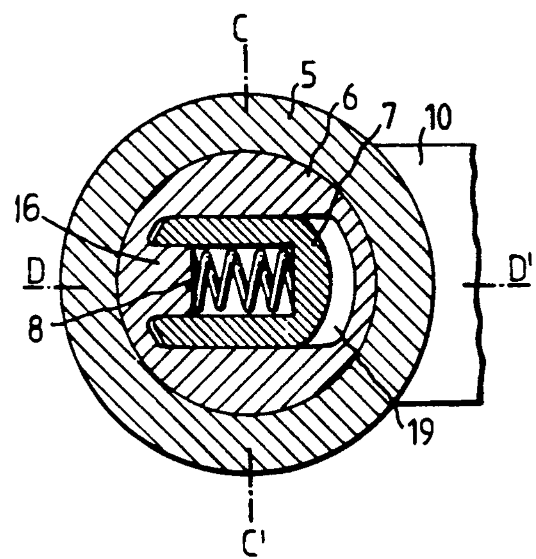

FIG. 5 shows the position of a tensioning wheel under increased track load and, as a result thereof, the idler wheel is displaced, despite the action of the force of the adjusting element (8), in the longitudinal direction of the vehicle towards the drive wheel (4).

Both figures illustrate the displaceability of the idler-wheel carrier (6) on the support body (7). Depending on the operating position, empty spaces (18) or a free space (19) are created in the idler-wheel carrier (6).

Figure 6:
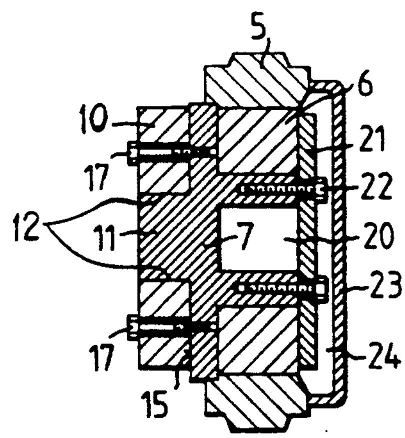

FIG. 6 is a section C—C' through the showings of FIGS. 4 and 5. There can be clearly noted the mounting of the support body (7) on the lateral vehicle superstructure, the beam (10), via the plate surface (15). There can be clearly noted also the construction with a crossbar-like development (11) supported in the slot-like bearing opening (12) of the beam (10). The screws (17) assure a frictional lock between the abovementioned elements. On the support body (7) there is displaceably provided the idler-wheel carrier (6), which is rotatably surrounded by the idler wheel (5). FIG. 6 furthermore shows the cavity (20) of the support body (7) can be closed off in the transverse direction of the vehicle by a cover (21), for instance by means of tension bolts (22). The cover (21) can then represent mechanically the lateral guidance of the idler-wheel carrier (7). In this way, transverse forces which come from the track (3) and are transmitted to the idler wheel (5) and the idler-wheel carrier (6) are conducted directly onto the support body (7) and thus into the lateral vehicle superstructure.

Figure 7:
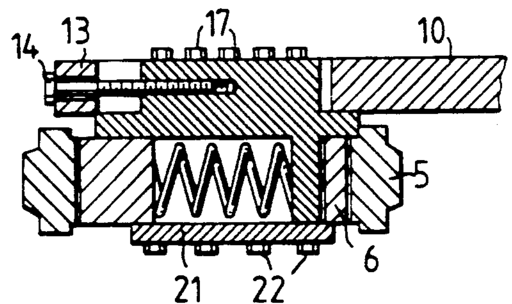
Figure 8:
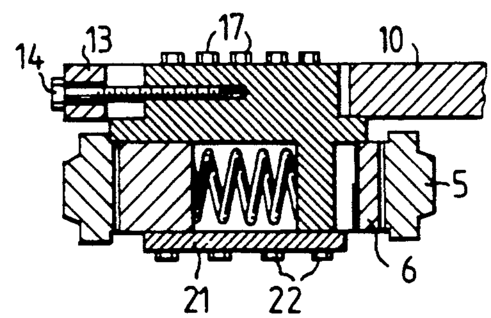

FIG. 6 finally shows a hubcap-like seal (23) which covers the idler-wheel carrier (6). The inner space (24) which is thus created can be filled with lubricant so that not only is the entry of foreign particles, and in particular of particles of dirt, between the individual elements of the tensioning wheel prevented but at the same time it is seen to it that the moving parts are lubricated well on all sides. FIGS. 7 and 8 show sections D—D' of FIGS. 4 and 5 in the corresponding operating positions.

Figure 9:
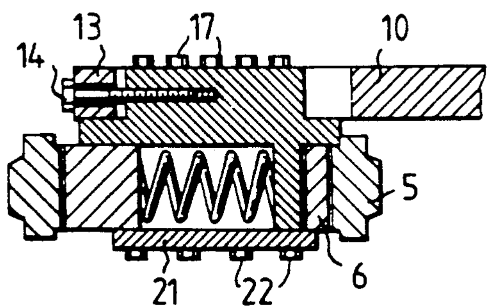
Figure 10:
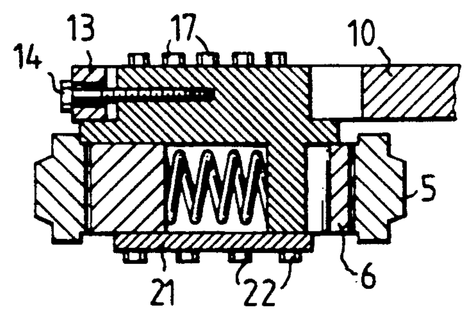

FIGS. 9 and 10 show different positions of the crossbar-like development (11), adjusted by means of the adjusting screw (14). It can be noted therefrom that a lengthening of the track upon a large number of hours of operation can be compensated for in view of the spring-like displaceability of the idler wheel (5).

It is particularly evident from the above-described FIGS. 7-10 that the spring element which must necessarily be provided for the tensioning wheel does not produce any additional moment and that the mounting of the idler wheel on the idler-wheel carrier is also developed free of moment. There is finally to be noted the compact construction of the idler within the traction system.

REFERENCE NUMBERS

1—Vehicle chassis
2—Track
3—Track shoe
4—Drive wheel
5—Idler wheel
6—Idler-wheel carrier
7—Support body
8—Adjusting element
9—Track roller
10—Beam
11—Development
12—Bearing opening
13—Edge
14—Adjusting screw
15—Plate surface
16—Pin
17—Screws
18—Empty space
19—Free space
20—Cavity
21—Cover
22—Tension bolt
23—Seal
24—Inner space

I claim:

1. A tensioning wheel system for the track chains of a tracked vehicle comprising a tensioning device, and a support body of the tensioning device, the tensioning device being adjustable in a longitudinal direction of the vehicle, the support body having a cavity;

wherein the vehicle has a chain-carrier frame part with a slot-like opening, the tensioning device being mounted in the slot-like opening;

the system further comprising a tensioning-wheel carrier which is displaceable in the longitudinal direction of the vehicle, and surrounds an outer portion of the support body;

a pin-shaped connecting member located on an inside of the carrier and extending into said cavity;

an adjusting element with spring characteristic located in said cavity and abutting the pin-shaped connecting member; and a tensioning wheel mounted on said tensioning-wheel carrier.

2. A system according claim 1, wherein said support body includes a plate with a plate surface; and said support body has a crossbar-like development extending transversely of the vehicle and inward from the plate surface of the support body.

3. A system according to claim 2, wherein said slot-like opening is a bearing opening;

the slot-like bearing opening is developed in the longitudinal direction of the vehicle in a lateral vehicle superstructure end region; and wherein said crossbar-like development of the support body engages into the slot-like bearing opening.

4. A system according to claim 3, further comprising a lockable adjusting screw; and wherein a position of said crossbar-like development in said slot-like bearing opening is adjustable in the longitudinal direction of the vehicle by the lockable adjusting screw, the screw engaging through an edge of the vehicle superstructure end region.

5. A system according to claim 4, wherein a position of said crossbar-like development established in the longitudinal direction of the vehicle is fixed by frictional engagement of said plate surface of the support body against the lateral vehicle superstructure.

6. A system according to claim 5, further comprising transverse screws extending transversely of said vehicle; and wherein said frictional engagement is produced by said transverse screws which are guided in the transverse direction of the vehicle and engage in said support body through the lateral vehicle superstructure.

7. A system according to claim 2, wherein there is a transition between the plate surface and said opening, said transition being developed step-shaped.

8. A system according to claim 2, further comprising a cover; and wherein said cavity of the support body is closed off by the cover.

9. A system according to claim 8, wherein said cover of said cavity of said support body represents mechanically a lateral guidance of said wheel carrier.

10. A system according to claim 2, wherein surfaces of the support body are developed in the longitudinal direction of the vehicle, and serve as bearing surfaces of said wheel carrier, said carrier being provided on its inside, in part, with bearing surfaces extending in the longitudinal direction of the vehicle.

11. A system according to claim 1, wherein said support body is mounted cantilevered in a lateral vehicle superstructure.

12. A system according to claim 1, wherein a lateral vehicle superstructure comprises a solid beam developed in the longitudinal direction of the vehicle, said solid beam serving as said frame carrier part.

13. A system according to claim 1, wherein said adjusting element is disposed fixed in position in said cavity of the support body.

14. A system according to claim 13, wherein said adjusting element has a pre-selectable spring characteristic.

15. A system according to claim 1, wherein said tensioning wheel has on its outside, in the transverse direction, a hubcap-like sealing which covers said support body and said wheel carrier.

16. A system according to claim 15, wherein said hubcap-like sealing defines an inner space formed in the tensioning wheel, the inner space being filled with lubricant.

17. A system according to claim 1, wherein said pin-shaped connecting member between the wheel carrier and the adjusting element comprises a pin developed on an inner wall of the wheel carrier.

18. A system for tensioning the track chains of a tracked vehicle comprising an idler wheel engaging with a track chain, and a carrier for the idler wheel;

a support body having a first portion extending into the carrier, the carrier having a space elongated in a longitudinal direction of the vehicle for receiving the first portion of the support body to allow longitudinal displacement of the carrier relative to the support body;

adjustment means for displacing the carrier relative to the support body for positioning the carrier and the idler wheel to tension the track chain;

wherein the vehicle has a frame part with a slot-like opening extending in the longitudinal direction of the vehicle; and a second portion of the support body extends into the slot-like opening for displacement in the longitudinal direction of the vehicle for tensioning the track chain.

19. A system according to claim 18, wherein said first portion of said support body has a cavity, and said adjustment means is disposed in said cavity.

* * * * *